United States Patent

[11] 3,587,023

[72] Inventors  Gerhard Goessler
 Moerikestrasse 46, Oberderdingen Wurttenburg;
 Robert Kicherer, Im Bergfeld 33, Knittlingen Wurttenberg, both of, Germany
[21] Appl. No. 720,713
[22] Filed Apr. 11, 1968
[45] Patented June 22, 1971
[32] Priority Apr. 14, 1967
[33] Germany
[31] E33790VIId/21h

[54] POWER CONTROLS OF ELECTRICALLY HEAT APPLIANCES PARTICULARLY COOKING PLATES
10 Claims, 10 Drawing Figs.
[52] U.S. Cl. ............................................. 337/103, 219/511, 337/105
[51] Int. Cl. ..................................... H01h 37/12, H01h 61/013, H05b 1/02

[50] Field of Search............................................337/3, 102, 103, 104, 105, 107, 100, 377; 219/442, 449, 450, 452, 511, 441, 448, 490

[56] References Cited
UNITED STATES PATENTS

| | | | |
|---|---|---|---|
| 2,847,554 | 8/1958 | Huffman | 219/442 |
| 2,763,750 | 9/1956 | Adams et al. | 337/104 (X) |
| 2,448,289 | 8/1948 | Anderson | 219/511 |
| 2,399,423 | 4/1946 | Bletz | 219/449 (X) |
| 2,354,918 | 8/1944 | Kearsley | 219/511 |

Primary Examiner—Bernard A. Gilheany
Assistant Examiner—Dewitt M. Morgan
Attorney—Sparrow and Sparrow ABSTRACT: Power controls for electrically heated appliances, such as cooking plates. An energy control element in the power controls with a bimetallic member which has a control heating element and a contactor which influences the control heating element therein.

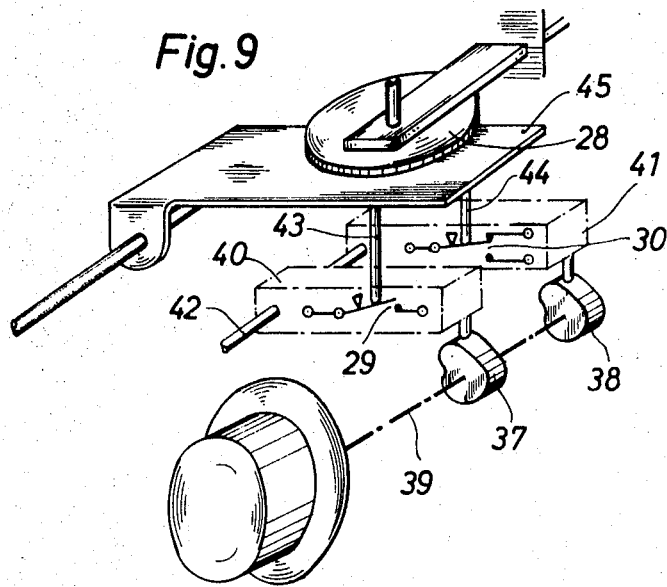
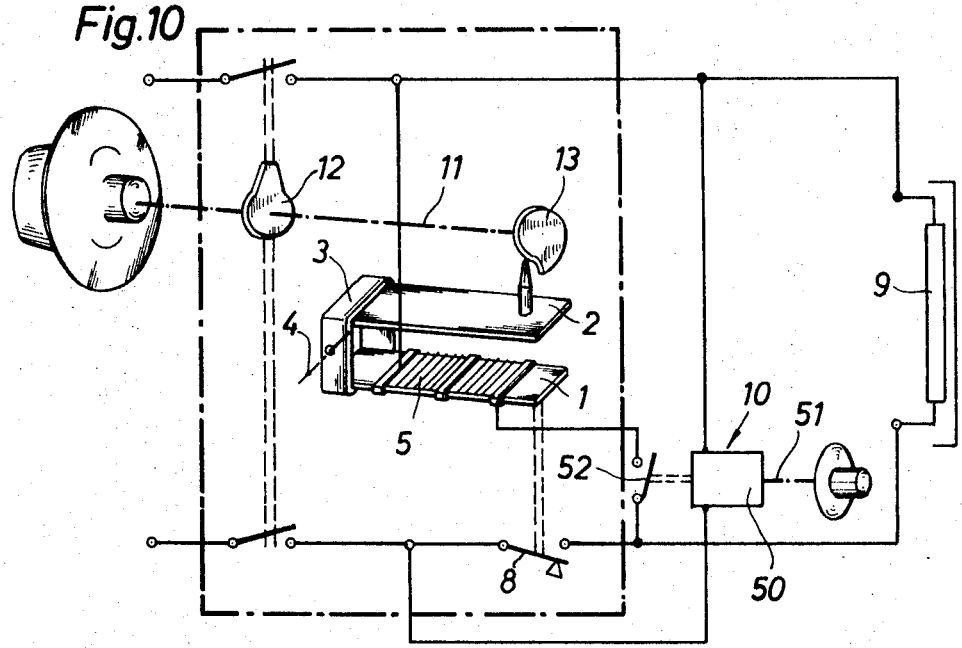

3,587,023

POWER CONTROLS OF ELECTRICALLY HEAT APPLIANCES PARTICULARLY COOKING PLATES

BACKGROUND OF THE INVENTION

The invention relates to electrically heated appliances such as cooking plates and particularly to power controls for these appliances.

Power controls of this kind are known in which both the controls for the power and the contactor, switch the power feed off the electrically heated appliance.

SUMMARY

This invention is based on the problem to reduce the amount of the costs for such controls. This problem is solved according to the invention in such manner that the control heating of the power controls is operated by the voltage of the appliance and that the power controls themselves switch only the power feed for the electrically heated appliance; whereas the contactor only feeds control contacts. Thus, only one single heavy-duty switch must be provided for a high switching power, that is one with a powerful instantaneous toggle switch mechanism and with costly contacts. The contacts of the contactor which have only to switch the low load of the control heating means can make creeping contacts and may be made of a less precious material, that is, may be manufactured less expensively.

The contactor may switch dependent upon the temperature from the electrically heated appliance, for example consisting of an overheat protecting switch or of an adjustable temperature controller. But is is also possible to use a time relay as a contactor which becomes effective when the electrically heated appliance is switched on.

It is preferred to add an additional resistor to the heating resistor on the bimetallic member of the control heating, which can be switched by the contactor in the sense of an increase of the power of the control heating. The power which is fed to the cooking plate may be varied by corresponding dimensioning of the two heating resistors.

The invention is further described in detail referring to several examples of preferred embodiments.

In its preferred embodiments, the invention is a power control device for electrically heated appliances, such as cooking plates. The control device has power controller embodying a bimetallic member with control heating resistor means and has a contactor influencing the said means; the contactor having control contacts. The control heating of the power controller is operated with the appliance voltage and by the power controller switching only the power feed to the electrically heated appliance, whereas the contactor operates only the control contacts. The operation of the contactor is dependent on the temperature of the electrically heated appliance and preferably consists of a fixedly adjusted overheat protection switch and timing means becoming activated at switching on the electronically heated appliance. There may be provided two followup contacts, the contactor being built as an adjustable temperature controller operating the two followup contacts, the contactor being built as an adjustable temperature controller operating the two followup contacts whereby one of the two contacts reacting on a lower temperature renders the control heating of the power controller effective and whereby the other one of said contacts reacting on a higher temperature switches the control heating over to continuous duty. There may be provided a control shaft having a plurality of cams and an expansion member in the temperature controller, the two followup contacts being arranged to be set against the expansion member by said cams independently of one another.

The heating resistor of the control heating on the abovementioned bimetallic member may have an auxiliary resistor arranged to be switched by said contactor for increasing the power of said control heating, the auxiliary resistor being connected with the heating resistor of the control heating in series and being arranged to be short-circuited by said contactor, the auxiliary resistor being also attached to the bimetallic member and separately arranged from the latter and arranged to be switched in parallel to said heating resistor by said contactor.

There may be further provided a compensating bimetallic member, the auxiliary resistor being attached to the compensating bimetallic member and being arranged to be switched parallel to said heating resistor on said bimetallic member by the contactor; also hand-operated adjusting means, the auxiliary resistor arranged to be operated independently of said contactor in the lower adjusting range of the power controller by said adjusting means in the sense of an increase of the control power.

The power control device according to an embodiment of the invention is provided with a second bimetallic member, the auxiliary resistor being attached thereto and being independent of the adjusting means of the power controller, the second bimetallic member arranged to be switched parallel to the heating resistor of the first bimetallic member by said contactor, whereby both bimetallic members are adapted to act separately on said switch controlling the power feed to the electrically heated appliance.

As a further embodiment the power control device has a hot wire arranged before said control heating of the power controller, the hot wire adapted to increase the power of said control heating dependent upon the duration of the switched time. The device also has a further resistor, the switch controlling the power feed to the electrically heated appliance switching the further resistor before the hot wire by way of a changeover contact when the switch disconnects the power feed to the appliance, the size of the further resistor corresponding to said switched-off heating resistor of the control heating. The contactor may consists of a timer arranged to start running when the appliance is switched on.

BRIEF DESCRIPTION OF THE DRAWINGS

Like reference characters denote like parts in the several figures of the drawing, in which FIGS. 1 to 10 show various embodiments by which the invention may be realized.

DESCRIPTION OF PREFERRED EMBODIMENTS

Figure 1:
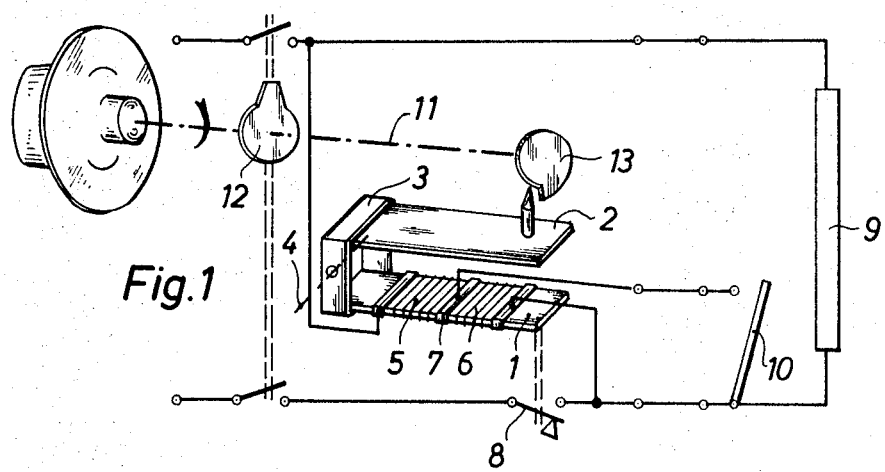

In the embodiment shown in FIG. 1, the bimetallic member 1 which has the control heating means and an unheated bimetallic member 2 are fastened approximately parallel to one another on a support 3 which can be rotated about a shaft 4. The control heating means of bimetallic member 1 consists of two heating resistors 5 and 6. Heating resistor 6 will be hereinafter defined as an auxiliary resistor. Both heating resistors are arranged on bimetallic member 1 in the embodiment shown in FIG. 1. The splitting of the control heating means on the bimetallic element is achieved in the simplest manner by tapping the continuous resistor coil on a clamp 7 which is arranged on it. Bimetallic member 1 influences a switch 8 which is arranged in the circuit of the appliance heater 9, for example of the heating coil of an electric cooking plate. Heating control resistors 5, 6 are switched in parallel to appliance heaters 9 and thus is operated with the appliance voltage of 200 volts, for example. Therefore, they have a very high resistance according to their small power of a few watts. Auxiliary resistor 6 which is switched in series with heating resistor 5 can be short-circuited by a contact 10 which is influenced by the temperature of the electrically heated appliance, which contactor is built as an overheat protecting switch in the embodiment of FIG. 1.

The adjusting shaft 11 of the power controls has a switching cam 12 for each switch in the feedline and in the return line and has a switching cam which determines the position of the rotation of the bimetallic system 1, 2, 3 and which operates on unheated bimetallic member 2. By this arrangement, bimetallic member 2 acts as a compensating member which takes the ambient temperature into consideration. Reference numeral 1 represents the workload bimetallic member. Corresponding to the position of adjusting shaft 11, workload bimetallic member 1 is moved by the cam 13 more or less toward power switch 8, and it can open switch 8 sooner or later or not at all when the control heating means is switched on. Appliance heaters 9 and control heating of the power controls are switched off when switch 8 is opened. Bimetallic member 1 can then close again switch 8 after a cooling period and can switch anew appliance heaters 9 and heating controls 5,6. Corresponding to the proportion of switched-on time to switched-off time in the operating cycle, which depends on positioning of bimetallic system 1, 2, 3 relative to switch 8, the actual power feed to electrical heating appliance 9 is adjusted. If then auxiliary resistor 6 is short-circuited by contactor 10 when a certain temperature of the electrically heated appliance is reached, heat resistor 5 which had been arranged in series up to this point, is switched on alone and the effect of the control heating is increased. The consequence thereof is that bimetallic element 1 is bent more toward switch 8 and the proportion of switched-on time to switched-off time is diminished, whereby the power feed to the electrically heated appliance is reduced. When contactor 10 is reopened because the temperature of the electrically heated appliance decreases correspondingly, the original starting condition is temporarily reinstated.

Switch 8 alone switches the power feed to electrically heated appliance 9 and therefor is designed for a heavy-duty switch work. Contactor 10 switches only the power of the control heating comprising a few watts and can therefor be equipped with inexpensive contacts for creeping operation. It is designed in the embodiment of FIG. 1 as an overheat protecting switch, attached to the electrically heated appliance, in the form of an instantaneously contacting bimetallic member through which the control voltage passes. Since the resistance of the control heating is very high, that is several kiloohms, a change of the contact resistance at the contacts of contractor 10, which may be of the order of magnitude of several ohms, is practically without influence.

Auxiliary resistor 6 also may be arranged at another point instead at workload bimetallic member 1. The mode of operation is not changed thereby.

Figure 2:
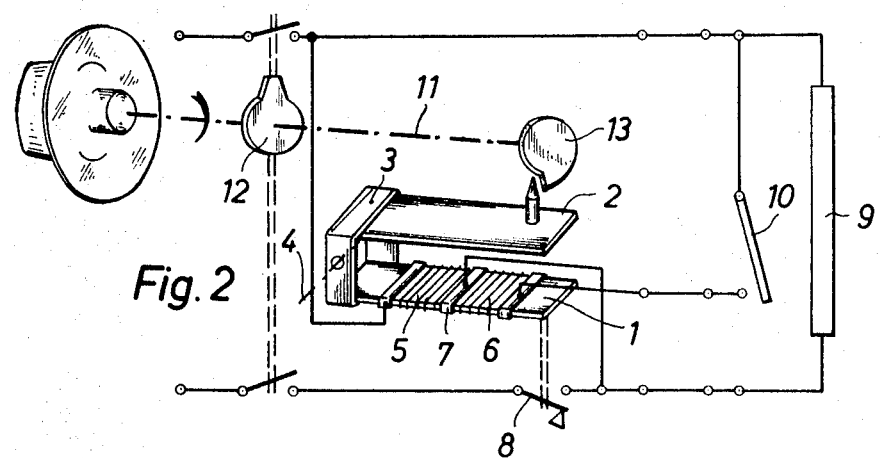

In the example of an embodiment shown in FIG. 2, auxiliary resistor 6 is switched parallel to heating resistor 5, whereby contactor 10 also closes when the temperature on electrically heated appliance 9 rises. Auxiliary resistor 6 can be switched on by contactor 10. Thus, heating resistor 5 is alone switched on and auxiliary resistor 6 will be switched additionally in parallel by contactor 10 so that the power of the control heating is increased and the power feed to the electrically heated appliance is reduced. In this case, auxiliary resistor 6 must be arranged on bimetallic member 1.

Figure 3:
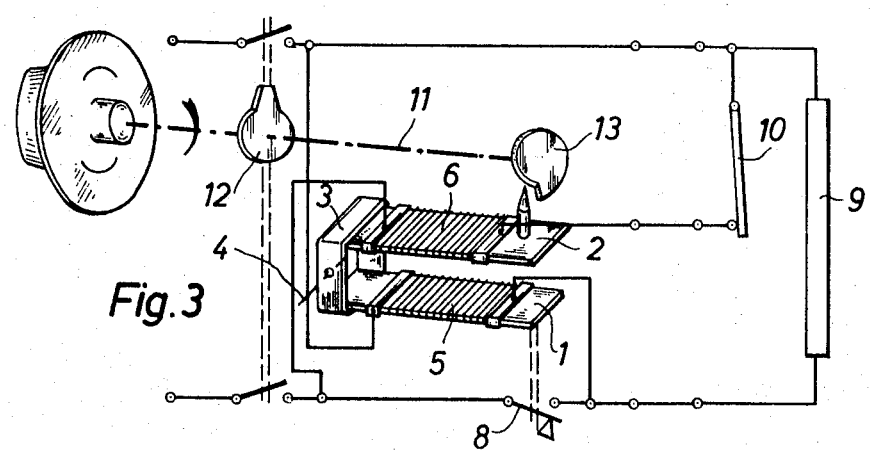

The embodiment shown in FIG. 3 differs from the example shown in FIG. 2 in that auxiliary resistor 6 is attached to compensating bimetallic member 2 and that contactor 10 opens at increasing temperature of the electrically heated appliance. The effect is basically the same. When contactor 10 switches off auxiliary resistor 6, bimetallic element 2 bends away from bimetallic element 1. The result is that system 1, 2, 3 swings closer to power switch 8, thereby diminishing the proportion between switched-on time and switched-off time and reducing the effective power feed to the electrically heated appliance.

Figure 4:
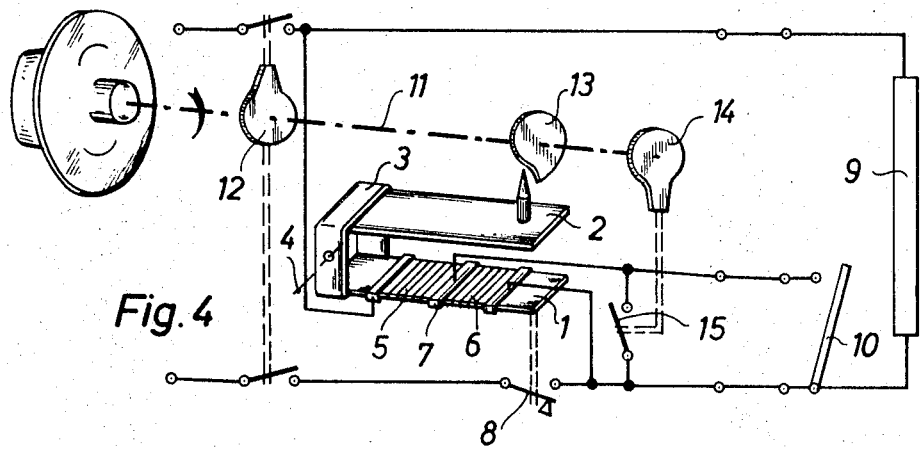

FIG. 4 shows the same arrangement as FIG. 1. There is an additional switch 15 provided which can be operated from adjustment shaft 11 by way of a cam 14. Switch 15 can short circuit auxiliary resistor 6 independently of contactor 10. Cam 14 is designed in such fashion that switch 15 is closed in a lower portion of the control range so that the maximum possible control heating may be switched on in this range achieving thereby a small effective power of the electrically heated appliance.

Figure 5:
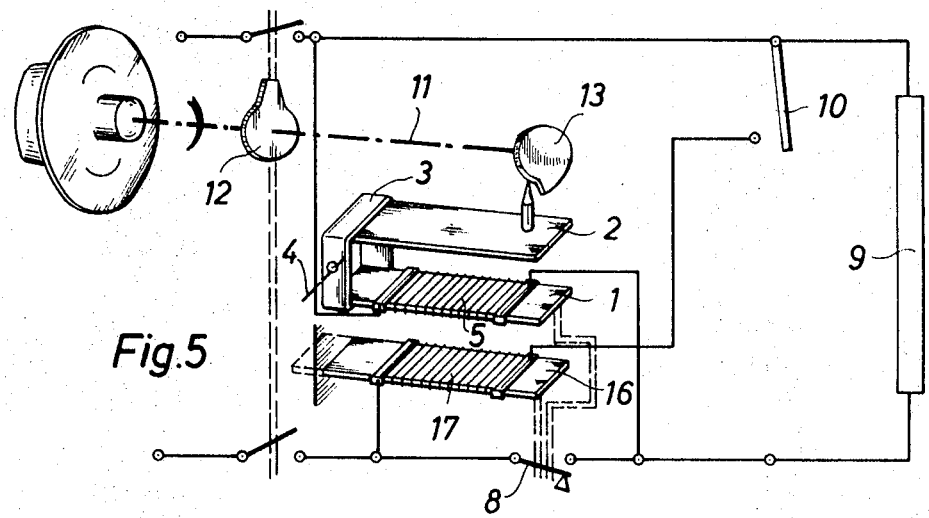

In the example shown in FIG. 5 a single heating resistor 5 is only arranged on workload bimetallic member 1. Compensating bimetallic member 2 on which cam 13 of adjusting shaft 11 operates in the manner as described above, is not heated. A second workload bimetallic member with a heating resistor 17 is additionally provided, which can open switch 8 independently of workload bimetallic member 1. Bimetallic member 16 is stationarily clamped by one of its ends and therefor cannot be influenced by the adjusting shaft.

Heating resistor 5 on workload bimetallic member 1 is constantly switched on so that switch 8 cycles according to the position of adjusting shaft 11 in a corresponding proportion between switched-on time and switched-off time. When now heating resistor 17 of bimetallic member 16 is switched on in parallel to heat resistor 5 by temperature-dependent contactor 10, bimetallic member 16 will open switch 8 or keeps it in the open position if it had been already opened by bimetallic member 1. Therewith the power feed to the electrically heated appliance is determined by the heating of bimetallic member 16.

The power controls which have been described above, are operated in such manner that the power which has been selected on adjustment shaft 11, is controlled from the start of the switching, disregarding the negligibly short time which the bimetallic member requires for being heated from the ambient temperature to the working temperature. It is frequently desired to prevent the cycling for a certain period of time after the first switching-on of the power controls, so that the full power is fed to the electrically heated appliance resulting in a short heating-up time.

Figure 6:
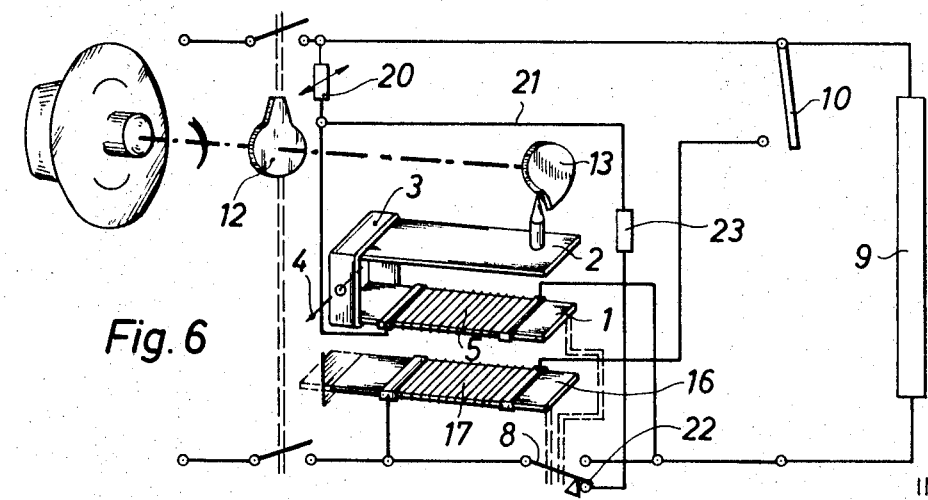

This is made possible in the example shown in FIG. 6 by arranging a hot wire 20 before heating resistor 5 of bimetallic member 1 in the circuitry corresponding to FIG. 5 and by branching off a wire 21 between hot wire 20 and the heating resistor. Wire 21 is connected to a reversing contact 22 of switch 8 and contains a resistor 23.

When now the power controls are switched on, at first a weak current flows only through heating resistor 5 of bimetallic member 1 which is by far not sufficient for operating switch 8. Hot wire 20 is slowly heated by the flowing current so that its resistance decreases gradually. In the same proportion the power of the control heating increases until eventually the control power climbs up to its full value after the state of balance has been reached and until the power control cycles in the usual manner corresponding to the setting of adjustment shaft 11. When then contactor 10 is closed, heating resistor 17 of bimetallic member 16 is switched on. The result is that almost instantaneously switch 8 disconnects the electrically heated appliance and heating resistor 5 and switches it over to contact 22 provided that this had not already been made by bimetallic member 1. The resistor 23 in wire 21 corresponds to heating resistor 5. Thus the current flowing through hot wire 20 remains the same after heat resistor 5 has been switched off. Thus, hot wire 20 retains its temperature which it had reached up to the switching time and remains ineffective for the ensuing time period so that the start of the cycling is not retarded after switch 8 has been switched back.

Figure 7:
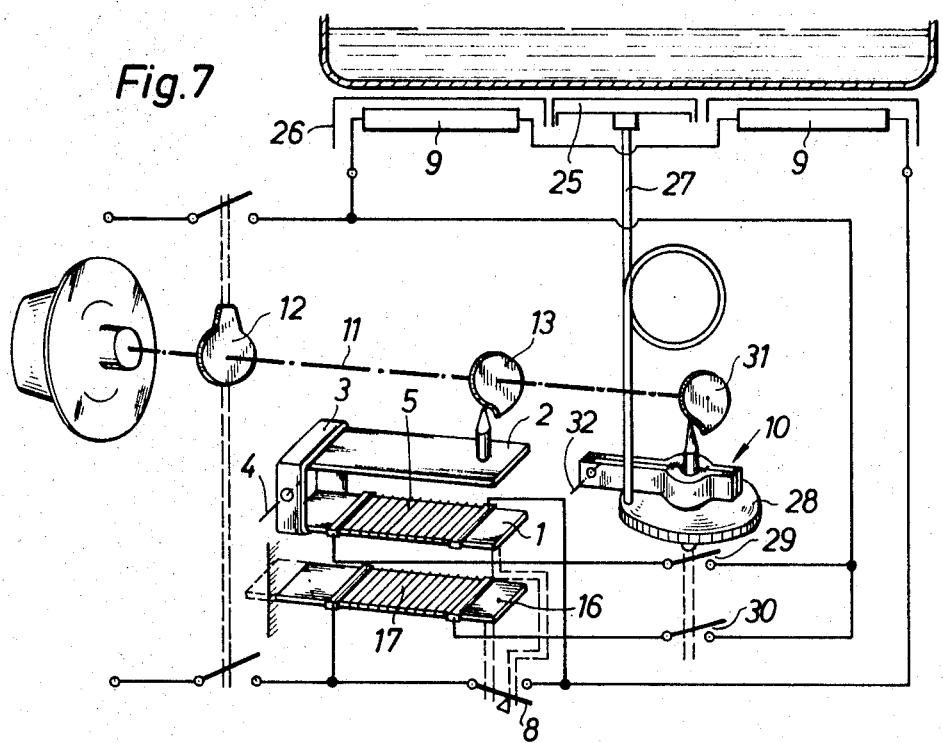

A further example is shown in FIG. 7 in which contactor 10 is formed by an adjustable temperature controller which is coordinated with the electrically heated appliance. The electrically heated appliance constitutes therein a cooking plate and the temperature controller is a hydraulic controller having a disclike temperature feeler 25, which abuts in the known manner within a central opening of the body 26 of the cooking plate at the bottom of the utensil which is placed on the cooking plate. The expanding member 28 of the controller, shaped like a membrane box, which is connected with feeler 25 by a capillary 27, acts on two contacts 29 and 30, which close successively when the feeler temperature rises. The temperature is adjustable by way of a cam which is arranged on adjustment shaft 11 of the power control, depending upon the heating power which is selected on the power control. The cam acts on expanding member 28, which is for example, rotatable about a shaft 32, and determines the stroke of the membrane up to the operation of contacts 29 and 30.

In the same manner as in the examples shown in FIGS. 5 and 6, a heating resistor 5 is coordinated to workload bimetallic member 1, and an auxiliary resistor 17 is coordinated to an auxiliary workload bimetallic member 16. Both bimetallic members act on switch 8 which controls the power feed to electrically heated appliance 9. Contact 29, which is influenced by the lower feeler temperature, is arranged before heating resistor 5, and contact 30, which is influenced by the higher feeler temperature, is arranged before heating resistor 17.

When adjustment shaft 11 of the power control is rotated away from the "Off" position, switch 8 is closed. Contacts 29 and 30 which are influenced by contactor 10, are open. Therefore, heating resistors 5 and 17 remain without voltage at first. Thus the full heating power will be fed to the electrically heated appliance, disregarding the position of adjustment shaft 11. When contact 29 of the temperature controller is closed, heating resistor 5 of bimetallic member 1 is switched on. The result is that the power control on switch 8 cycles the heating power which has been selected on adjustment shaft 11. When then contact 30 is closed, because the temperature on feeler 25 still increased, heating resistor 17 of bimetallic member 16 will be also switched on. Under the increased power of the control heating, switch 8 is kept open, regardless of the cycling position which it had held at that instance. The heating current of electrically heated appliance 9 is then entirely switched off and it is only switched on again, when the temperature on feeler 25 has dropped so far that the second contact 30 of the temperature controller opens again. At that time the power which had been adjusted on the power control for cycling, will be fed to the electrically heated appliance. If the temperature on feeler 25 drops further, contact 29 also will open resulting in the appliance being operated again with the utmost possible power.

Figure 8:
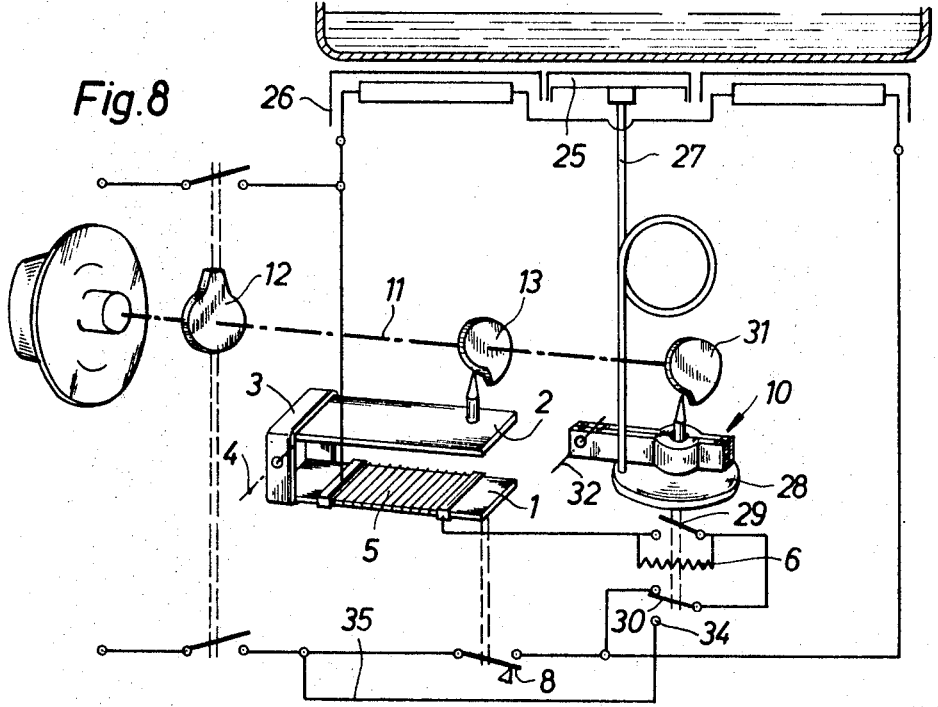

In FIG. 8 an identically operating embodiment with a single workload bimetallic member 1 and with a single heating resistor 5 which is arranged on it, is shown. The contactor 10 is a hydraulic temperature controller, as it is in FIG. 7, with a disc-shaped temperature feeler 25 and with an expansion member which is connected with feeler 25 and with an expansion member which is connected with feeler 25 by a capillary tube, which operates two contacts 29 and 30 which operate in successive order. Both contacts 29 and 30 are connected with heating resistor 5 in series. Contact 29 which closes at the lower feeler temperature, is closed for switching of the heating resistor 5 of bimetallic member 1 when the feeler temperature rises above the nominal value, whereas contact 30 switches at a slightly higher feeler temperature 5 to a contact 34 to which a wire 35 is connected bridging power switch 8. Contact 30 must act snappingly in order to switch over momentarily. Otherwise this example is equivalent to the example shown in FIG. 7.

When contact 29 of the temperature controller is closed, heating resistor 5 of bimetallic member 1 is switched on and the power control cycles on switch 8 the preselected power. When eventually contact 30 switches over to contact 34, resistor 5 of the control heating remains permanently switched on because switch 8 is bridged by wire 35. The result is that switch 8 remains switched off until contact 30 will be switched back again when the temperature on feeler 25 has dropped correspondingly.

Contact 29 which acts at the lower temperature, can be bridged by an auxiliary resistor 6 as it is shown in FIG. 8. Then a current flows from the start through heating resistor 5 of bimetallic member 1, which current is so much weakened by the additional auxiliary resistor, that switch 8 according to the setting of the temperature controller does not cycle any power or a considerably larger one than the one which has been set on the power control. When contact 29 is closed, auxiliary resistor 6 is short-circuited. Then the current flows only through heating resistor 5, so that the power of the control heating is increased to the value by which the power is cycled which has been set on the power control. In the examples shown in FIGS. 7 and 8 a fixed difference of the operating temperatures has been adjusted between the contacts 29 and 30 which are acted upon by the temperature controller. According to FIG. 9 both contacts 29 and 30 are independently adjustable from one another by cams 37 and 38 of an adjustment shaft 39 against the fixedly arranged expansion member 28 of the temperature controller. The supports 40 and 41 of contacts 29 and 30 are independently rotatable from one another about a common fixed shaft 42. Switching pins 43 and 44 of both contacts 29 and 30 cooperate with a tilting member 45 which is moved by the expansion member 28 of the temperature controller.

By these means the difference between the operating temperatures of both contacts 29 and 30 can be varied at will over the adjustment range; for example it can be enlarged with increasing heating power. This is, for example, advantageous for broiling operations. In this case it is useful to have a relatively large difference between the operating temperatures so that during the impulse-shaped power feed which starts after the acting of contact 29, a sufficiently large temperature range is available, within which the median power is fed which has been set on the power control without action of contact 30 interrupting the power feed to the cooking plate. Obviously, it is presumed that the correct median power has been set for the corresponding temperature, which permits a smooth broiling.

According to FIG. 10 the contactor 10 is a timer 50 which has an adjustment shaft 51 and which operates a contact 52 for a heating resistor 5 which is coordinated to the workload bimetallic member 1. Timer 50 is switched on together with the power control and closes contact 52 after the preset time period. Thereby heating resistor 5 gets voltage and the power control cycles on switch 8 the power which is fed to electrically heated appliance 9 with the frequency corresponding to the setting. Starting from the switching of the power control up to the operating of contact 52, the electrically heated appliance is operated with full power.

In this case an auxiliary resistor 6 also can be coordinated with the heating resistor 5 on bimetallic member 1, which is either attached to the latter or which is separately arranged therefrom and which is switched on or off by contact 52.

While the invention has been described and illustrated with respect to certain preferred examples which give satisfactory results, it will be understood by those skilled in the art after understanding the principle of the invention, that various changes and modifications may be made without departing from the spirit of the invention.

We claim:

1. Power control device for an electrically heated appliance such as a cooking plate, said appliance operated by a voltage, said control device comprising a power controller, said power controller including a bimetallic member and switch means actuated by said bimetallic member, a control heating resistor on said member, said resistor disposed for applying heat to said member, said member disposed to act on said switch means for switching the power feed on to said appliance, said resistor being energized only when said power is fed to said appliance, said control device further comprising an auxiliary resistor located on said control heating resistor, a contactor having control contacts, said contactor including means dependent on the temperature of said appliance, said means actuating said control contacts, said auxiliary resistor arranged in series with said control heating resistor, said contactor having contacts connected in parallel with said auxiliary resistor, said contacts being closed for increasing the heating power applied to said bimetallic member when the temperature of said appliance increases.

2. Power control device according to claim 1, and having hand-operated power adjusting means, said adjusting means having contacts, said contacts being connected in parallel with said means dependent on temperature whereby movement of said hand-operated adjusting means manually positions said contacts for shortcircuiting said resistor independently of said contactor.

3. Power control device for an electrically heated appliance such as a cooking plate, said appliance operated by a voltage, said control device comprising a power controller, said power controller including a bimetallic member, a control heating resistor on said member, said resistor disposed for applying heat to said member, said member disposed to act on said switch means for switching the power feed on to said appliance, said resistor being energized only when said power is fed to said appliance, said control device further comprising an auxiliary resistor, said auxiliary resistor being separately disposed from said bimetallic member, a contactor having control contacts, said contactor including means dependent on the temperature of said appliance, said means actuating said control contacts, said auxiliary resistor arranged in series with said control heating resistor, said contactor having contacts connected in parallel with said auxiliary resistor, said contacts being closed for increasing the heating power applied to said bimetallic member when the temperature of said appliance increases.

4. Power control device for an electrically heated appliance such as a cooking plate, said appliance operated by a voltage, said control device comprising a power controller, said power controller including a bimetallic member and switch means actuated by said bimetallic member, a control heating resistor on said member, said resistor disposed for applying heat to said member, said member disposed to act on said switch means for switching the power feed on to said appliance, said resistor being energized only when said power is fed to said appliance, said control device further comprising an auxiliary resistor located on said bimetallic member, a contactor having control contacts, said contactor including means dependent on the temperature of said appliance, said means actuating said control contacts, said auxiliary resistor arranged in series with said control heating resistor, said control contacts of said contactor electrically connected with said auxiliary resistor and being disposed for switching off the latter for increasing the heating power applied to said bimetallic member when the temperature of said appliance increases.

5. Power control device for an electrically heated appliance such as a cooking plate, said appliance operated by a voltage, said control device comprising a power controller, said power controller including a bimetallic member and switch means actuated by said bimetallic member, a control heating resistor on said member, said resistor disposed for applying heat to said member, said member disposed to act on said switch means for switching the power feed on to said appliance, said resistor being energized only when said power is fed to said appliance, said control device further comprising an auxiliary resistor, a compensating bimetallic member secured to said member, said auxiliary resistor being attached to said compensating bimetallic member, said auxiliary resistor being connected with said control heating resistor in parallel, a contactor having control contacts, said contactor including means dependent on the temperature of said appliance, said means actuating said control contacts, said control contacts being electrically connected in series with said auxiliary resistor for switching the latter into and out of parallel circuit with said control heating resistor.

6. Power control device for an electrically heated appliance such as a cooking plate, said appliance operated by a voltage, said control device comprising a power controller, said power controller including a first bimetallic member and switch means actuated by said first bimetallic member, a control heating resistor on said member, said resistor disposed for applying heat to said member, said member disposed to act on said switch means for switching the power feed on to said appliance, said resistor being energized only when said power is fed to said appliance, said control device further comprising an auxiliary resistor, a contactor having control contacts, and further having a second bimetallic member, said auxiliary resistor attached to said second bimetallic member, said auxiliary resistor having circuit means connecting said auxiliary resistor in series with said control contacts, said contactor including means dependent on the temperature of said appliance acting on said control contacts for switching said auxiliary resistor in parallel with said control heating resistor, whereby both bimetallic members are constructed for acting separately on said switch controlling the power feed to said appliance.

7. Power control device for an electrically heated appliance such as a cooking plate, said appliance operated by a voltage, said control device comprising a power controller, said power controller including a first bimetallic member and switch means actuated by said first bimetallic member, a control heating resistor on said member, said resistor disposed for applying heat to said member, said member disposed to act on said switch means for switching the power feed onto said appliance, said resistor being energized only when said power is fed to said appliance, said control device further comprising an auxiliary resistor located on a second bimetallic member disposed for actuating said switch independently of said first bimetallic means, a contactor having control contacts, said contactor including means dependent on the temperature of said appliance, said means actuating said control contacts, said auxiliary resistor arranged in parallel with said control heating resistor, said contactor having contacts connected in series with said auxiliary resistor, said contacts being closed for increasing heating power applied to said bimetallic member when the temperature of said appliance increases, a hot wire placed in series before said control heating resistor, said hot wire disposed to increase the heating power of said control heating resistor by decreasing its resistance while becoming hot, and a further resistor placed between said power controller and said hot wire, said controller controlling the power feed to said appliance and further switching-on said further resistor in series with said hot wire by way of a changeover contact when said controller disconnects said power feed to said appliance, said further resistor having a size corresponding to said switched-off control heating resistor.

8. Power control device for an electrically heated appliance, such as a cooking plate, said appliance operated by a voltage, said control device comprising a power controller, said power controller including a bimetallic member and switch means actuated by said bimetallic member, said member having a control heating resistor, a contactor in said control device, control contacts on said contactor, said control contacts being in electrical series with said resistor, said resistor being adapted to operate with said appliance voltage, said controller adapted to switch only the power to said appliance, while said contactor operates only said control contacts and switches only the power for operating said controller, said contactor including means dependent on the temperature of said appliance for controlling the operation of said control contacts when the temperature of said appliance increases, said contactor further including followup contacts, said followup contacts being electrically connected in series with said control heating resistor, said control contacts and said followup contacts disposed for operating in successive order, one of said two contacts being operated by said means dependent on the temperature controller at a lower temperature rendering said control heating of said power controller effective and the other one of said contacts being operated by said means dependent on the temperature of said appliance at a higher temperature, switching said control heating resistor over to continuous duty, and manual adjusting means for positioning said control contactor and said followup contacts independent of each other and adjusting the temperature points at which said followup contacts are operated by said means dependent on the temperature of said appliance.

9. Power control device according to claim 8, having a control shaft, a plurality of cams on said shaft, and said means dependent on the temperature of said appliance having an expansion member, said cams setting said two contacts against said expansion member independently of one another.

10. Power control device for an electrically heated appliance such as a cooking plate, said appliance operated by a voltage, said control device comprising a power controller having a switch means and a bimetallic member thereon, said member having a control heating resistor for applying heat to said member, said member mechanically connected to said switch means for switching on the power feed to said appliance, said resistor being energized alternatingly only when power is fed to said appliance, said control device further comprising a contactor having control contacts thereon, said contactor consisting of a manually adjustable timer, said timer disposed for running for a preset time period when said appliance is switched on, said timer being electrically connected to said control heating resistor and disposed for energizing said resistor with said voltage after said adjusting adjusted time period has elapsed, said control device further comprising manually operable means for pivotally adjusting said bimetallic member in relation to said switch means.